United States Patent
Saeki et al.

(10) Patent No.: US 12,547,563 B2
(45) Date of Patent: Feb. 10, 2026

(54) I/O UNIT

(71) Applicant: FANUC CORPORATION, Yamanashi (JP)

(72) Inventors: Masahiro Saeki, Yamanashi-ken (JP); Shinichi Kuwahata, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 18/283,508

(22) PCT Filed: Mar. 11, 2022

(86) PCT No.: PCT/JP2022/010774
§ 371 (c)(1),
(2) Date: Sep. 22, 2023

(87) PCT Pub. No.: WO2022/202387
PCT Pub. Date: Sep. 29, 2022

(65) Prior Publication Data
US 2024/0160589 A1 May 16, 2024

(30) Foreign Application Priority Data
Mar. 24, 2021 (JP) ................. 2021-049524

(51) Int. Cl.
G06F 13/20 (2006.01)
G05B 19/042 (2006.01)
G05B 19/05 (2006.01)
G06F 13/40 (2006.01)
G06F 13/42 (2006.01)

(52) U.S. Cl.
CPC .......... *G06F 13/20* (2013.01); *G06F 2213/40* (2013.01)

(58) Field of Classification Search
CPC .................. G06F 12/06; H04L 25/14
See application file for complete search history.

(56) References Cited

U.S. PATENT DOCUMENTS 8,203,361 B2    6/2012  Uchida et al.
11,620,077 B2*  4/2023  Borgonovo ......... G06F 12/0607
                                                711/154

(Continued)

FOREIGN PATENT DOCUMENTS

JP   9-244772 A    9/1997
JP   09-247766 A   9/1997

(Continued)

OTHER PUBLICATIONS

International Search Report for PCT/JP2022/010774 dated May 17, 2022.

(Continued)

*Primary Examiner* — Getente A Yimer
(74) *Attorney, Agent, or Firm* — Sughrue Mion, PLLC

(57) ABSTRACT

An I/O unit transmits signals between a master unit and instruments. The master unit has two redundant master processing circuits. The I/O unit includes: a first slave processing circuit that performs input and output of signals with respect to one of the two master processing circuits; and a second slave processing circuit that performs input and output of signals with respect to the other one of the two redundant master processing circuits.

3 Claims, 3 Drawing Sheets

(56) References Cited

U.S. PATENT DOCUMENTS

| | | | |
|---|---|---|---|
| 2013/0159593 A1 | 6/2013 | Yeung | |
| 2013/0238825 A1* | 9/2013 | Hiraoka | H04L 25/14 |
| | | | 710/110 |
| 2013/0297829 A1 | 11/2013 | Berenbaum et al. | |
| 2014/0022593 A1* | 1/2014 | Seki | G06F 12/06 |
| | | | 358/1.15 |
| 2019/0056955 A1* | 2/2019 | Pennala | G06F 9/5077 |
| 2019/0243793 A1 | 8/2019 | Karb et al. | |
| 2020/0089634 A1* | 3/2020 | Jalal | G06F 13/364 |
| 2020/0333758 A1 | 10/2020 | Kretschmann | |

FOREIGN PATENT DOCUMENTS

| | | |
|---|---|---|
| JP | 2002-091519 A | 3/2002 |
| JP | 2005-025260 A | 1/2005 |
| JP | 2011-130307 A | 6/2011 |
| JP | 2013-012094 A | 1/2013 |
| JP | 2016-110460 A | 6/2016 |
| JP | 2018-136810 A | 8/2018 |
| JP | 2018-157456 A | 10/2018 |
| JP | 2019-114085 A | 7/2019 |
| JP | 2021-002172 A | 1/2021 |
| TW | 201830276 A | 8/2018 |

OTHER PUBLICATIONS

Extended European Search Report dated Feb. 7, 2025 from the European Patent Office in Application No. 22775179.9.

* cited by examiner

I/O UNIT

CROSS REFERENCE TO RELATED APPLICATIONS

This application is a National Stage of International Application No. PCT/JP2022/010774 filed Mar. 11, 2022, claiming priority based on Japanese Patent Application No. 2021-049524 filed Mar. 24, 2021, which are incorporated herein by reference.

TECHNICAL FIELD

The present invention relates to an I/O unit for connecting a master unit and a device and performing signal transmission between the master unit and the device.

BACKGROUND ART

JP 2016-110460 A discloses a programmable logic controller system. The programmable logic controller system includes a base unit serving as a master, a plurality of expansion units (I/O units) serving as slaves, and a controlled device. The base unit transmits and receives signals to and from the controlled device via the extension unit. The plurality of expansion units are daisy-chain connected together, with the master unit being at the head. The controlled device is, for example, a device such as a sensor or an actuator.

SUMMARY OF THE INVENTION

The master unit and the plurality of I/O units constitute a communication unit. In this communication unit, the master unit and the plurality of I/O units are arranged along a predetermined installation direction with the master unit at the head. Each of the master unit and the plurality of I/O units includes a terminal. A terminal of a master unit is connected to a terminal of an I/O unit next to the master unit. A terminal of an I/O unit is connected to a terminal of an adjacent master unit or a terminal of another I/O unit. With this configuration, it is possible to connect the slave processing circuits of the plurality of I/O units to the master processing circuit of the master unit in a daisy chain manner without separately requiring a cable or the like.

Here, devices related to safety are often made redundant. That is, a device provided in a machine such as a machine tool or a robot may be a device related to the operation of the machine. Such a device related to the operation of the machine is made redundant for safety. For example, a device (detector or the like) that detects an operation of an emergency stop button for stopping a machine is made redundant. In this case, a communication unit including a master unit and a plurality of I/O units connected to the master unit in a daisy chain manner is also made redundant.

One of the redundant devices is connected to an I/O unit of one communication unit. The other device is connected to an I/O unit of the other communication unit. Here, wiring such as a cable is used to connect the devices and the I/O units. However, when the devices and the I/O units are connected by wiring, it is difficult to determine which I/O unit is to be connected to which redundant device as a pair. Therefore, when a device is made redundant, there is a possibility that an I/O unit different from an I/O unit to be originally connected is connected to the redundant device.

The present invention has the object of solving the aforementioned problems.

An I/O unit according to an aspect of the present invention is an I/O unit that connects a master unit and a device and transmits a signal between the master unit and the device. The master unit includes two redundant master processing circuits. The I/O unit includes: a first slave processing circuit configured to perform input and output of a signal with respect to one of the two redundant master processing circuits; and a second slave processing circuit configured to perform input and output of a signal with respect to another of the two redundant master processing circuits.

According to an aspect of the present invention, it is possible to prevent erroneous connection between a redundant device and an I/O unit.

DETAILED DESCRIPTION OF THE INVENTION

Figure 1:
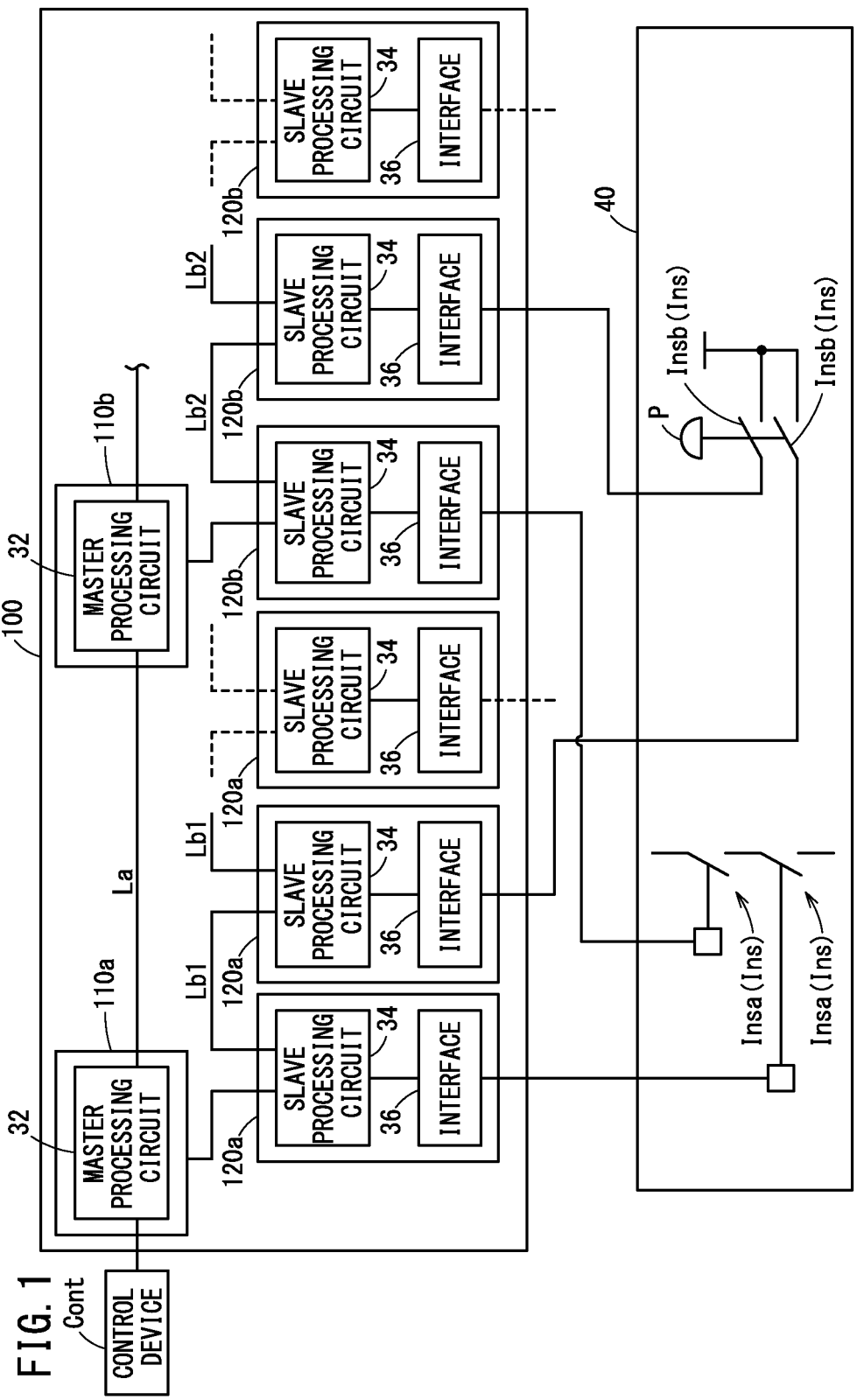
FIG. 1 is a diagram illustrating a communication system according to a reference example of the present invention.

FIG. 1 is a diagram illustrating a communication system 100 according to a reference example of the present invention.

The communication system 100 is a system that transmits signals between a control device Cont and devices Ins. The device Ins is provided in a mechanical apparatus 40 such as a machine tool or a robot. The device Ins is an output device Insa or an input device Insb. The output device Insa is, for example, an actuator such as a switch. When driving the output device Insa, the control device Cont sends a control signal to the output device Insa via the communication system 100. The input device Insb is, for example, a sensor that detects pressure, voltage, current, or the like. The control device Cont acquires a detection signal output from the input device Insb via the communication system 100.

The communication system 100 includes a communication coupler unit 110a, a communication coupler unit 110b, a plurality of I/O units 120a, and a plurality of I/O units 120b. The communication coupler unit 110a and the communication coupler unit 110b are daisy-chain connected to the control device Cont in this order. The plurality of I/O units 120a are daisy-chain connected to the communication coupler unit 110a. The plurality of I/O units 120b are daisy-chain connected to the communication coupler unit 110b. A plurality of devices Ins are connected to the plurality of I/O units 120a and I/O units 120b. In the example illustrated in FIG. 1, one device Ins is connected to one I/O unit 120a to simplify the description. In the following description, when the communication coupler unit 110a and the communication coupler unit 110b are not distinguished from each other, the communication coupler units are denoted by reference numeral 110. Similarly, in the following description, when the I/O unit 120a and the I/O unit 120b are not distinguished from each other, the I/O units are denoted by reference numeral 120.

Each of the communication coupler unit (master unit) 110a and the communication coupler unit (master unit) 110b includes a master processing circuit 32. The I/O unit (slave unit) 120a and the I/O unit (slave unit) 120b each include a slave processing circuit 34 and an interface 36. The slave processing circuit 34 is a processing circuit that performs input and output of signals with respect to the master processing circuit 32. The interface 36 transmits signals between the slave processing circuit 34 and the device Ins. Each of the master processing circuit 32 and the slave processing circuit 34 may be configured by a central processing unit (CPU), an application-specific integrated circuit (ASIC), a programmable logic device (PLD), a field programmable logic gate array (FPGA), or the like.

The communication coupler unit 110a and the communication coupler unit 110b are daisy-chain connected by a main line La. Thus, the master processing circuits 32 of the communication coupler unit 110a and the communication coupler unit 110b are connected to the control device Cont. The plurality of I/O units 120a are daisy-chain connected by a branch line Lb1. As a result, the slave processing circuits 34 of the plurality of I/O units 120a are connected to the master processing circuit 32 of the communication coupler unit 110a. The plurality of I/O units 120b are daisy-chain connected by a branch line Lb2. As a result, the slave processing circuits 34 of the plurality of I/O units 120b are connected to the master processing circuit 32 of the communication coupler unit 110b.

When the control device Cont transmits a control signal to the device Ins, the control device Cont outputs the control signal to the communication coupler unit 110a which is connected to the first stage (first) of the control device Cont, among the two communication coupler units 110 belonging to the main line La. As a result, the control signal is input to the master processing circuit 32 of the communication coupler unit 110a. The control signal includes address information of the I/O unit 120 (slave processing circuit 34) to which the device Ins is connected. The master processing circuit 32 of the communication coupler unit 110a determines whether or not the address information indicates the I/O unit 120a that belongs to the branch line Lb1. When the address information indicates one of the plurality of I/O units 120a, the master processing circuit 32 of the communication coupler unit 110a outputs the control signal to the first-stage (first) I/O unit 120a among the plurality of I/O units 120a. As a result, the control signal is input to the slave processing circuit 34 of the first-stage I/O unit 120a. When the address information indicates the I/O unit 120b belonging to the branch line Lb2, the master processing circuit 32 of the communication coupler unit 110a outputs the control signal to the communication coupler unit 110b. In this case, the control signal is input by the master processing circuit 32 of the communication coupler unit 110b to the slave processing circuit 34 of the first-stage (first) I/O unit 120b among the plurality of I/O units 120b. According to the above description, the control signal output from the control device Cont is input to one of the slave processing circuit 34 belonging to the branch line Lb1 or the slave processing circuit 34 belonging to the branch line Lb2. The slave processing circuit 34 to which the control signal is input determines whether or not the address information of the control signal indicates the slave processing circuit itself. If the address information indicates itself, the slave processing circuit 34 outputs the control signal to the device Ins connected to the slave processing circuit itself. As a result, the control signal is input to the device Ins. The device Ins operates based on the input control signal. When the address information does not indicate the slave processing circuit 34 itself, the slave processing circuit 34 outputs the control signal to the I/O unit 120 (slave processing circuit 34) located at the subsequent stage of the slave processing circuit 34 itself. For example, when the address information does not indicate itself, the slave processing circuit 34 in the first stage of the branch line Lb1 outputs the control signal to the slave processing circuit 34 in the second stage of the branch line Lb1. Thus, the control signal is input to the slave processing circuit 34 indicated by the address information. In a case where the address information included in the control signal indicates the slave processing circuit itself, the slave processing circuit 34 may output the control signal not only to the device Ins connected to the slave processing circuit itself but also to the slave processing circuit 34 in the subsequent stage of the slave processing circuit itself. When the address information included in the control signal indicates the I/O unit 120a, the communication coupler unit 110a may output the control signal not only to the I/O unit 120a at the first stage of the branch line Lb1 but also to the communication coupler unit 110b.

There is a case where the device Ins outputs a signal to the slave processing circuit 34 of the I/O unit 120 connected to the device Ins itself. In this case, the slave processing circuit 34 of the I/O unit 120 adds address information indicating the slave processing circuit itself to the signal input from the device Ins connected to the slave processing circuit itself. In addition, the slave processing circuit 34 outputs the signal of the device Ins to which the address information is added, to the unit (the I/O unit 120 or the communication coupler unit 110) installed in the preceding stage of the slave processing circuit 34 itself in the branch line (the branch line Lb1 or the branch line Lb2). The I/O unit 120 to which the signal of the device Ins is input from the I/O unit 120 in the subsequent stage outputs the signal of the device Ins to the I/O unit 120 in the further preceding stage or the communication coupler unit 110 in the further preceding stage. Thus, the signal of the device Ins is input to the communication coupler unit 110. The communication coupler unit 110 to which the signal of the device Ins is input from the I/O unit 120 outputs the signal to the unit (the communication coupler unit 110 or the control device Cont) installed in the preceding stage in the main line La. Thus, the signal of the device Ins is input to the control device Cont.

The devices Ins related to safety for the mechanical apparatus 40 are often made redundant. That is, the device Ins related to the operation of the mechanical apparatus 40 is made redundant for safety. Here, two output devices Insa are made redundant. Here, two input devices Insb are also made redundant. Each of the two output devices Insa is, for example, an actuator related to the operation of the mechanical apparatus 40. The actuator related to the operation of the mechanical apparatus 40 is, for example, a switch that operates in response to input of a control signal. Each of the two input devices Insb is, for example, a sensor or the like related to the operation of the mechanical apparatus 40. The sensor related to the operation of the mechanical apparatus 40 is, for example, a detector that detects an operation of an emergency stop button P for stopping the mechanical apparatus 40 and generates a detection signal.

When the device Ins is made redundant, the communication system 100 is also made redundant. Here, the two redundant devices Ins perform input and output of signals with respect to the different master processing circuits 32, respectively. For example, in the example illustrated in FIG. 1, one input device Insb of the two redundant input devices Insb is connected to the interface 36 of the I/O unit 120a belonging to the branch line Lb1. The input device Insb performs input and output of signals with respect to the master processing circuit 32 of the communication coupler unit 110a via the branch line Lb1. The other input device Insb of the two redundant input devices Insb is connected to the I/O unit 120b belonging to the branch line Lb2. The input device Insb performs input and output of signals with respect to the master processing circuit 32 of the communication coupler unit 110b via the branch line Lb2.

The device Ins and the I/O unit 120 are connected to each other by wiring such as a cable. However, the communication system 100 includes a plurality of the I/O units 120. Therefore, as described above, it is difficult to grasp where the I/O unit 120 to be connected to the redundant device Ins as a pair is located. Therefore, there is a possibility that a redundant device Ins may be connected to an I/O unit 120 that is not paired with the redundant device Ins. In addition, when the installation location of the plurality of I/O units 120a connected to the branch line Lb1 and the installation location of the plurality of I/O units 120b connected to the branch line Lb2 are separated from each other, the possibility of the erroneous connection is further increased.

In order to solve such a problem, a communication system 30 of the present embodiment has the following configuration. Description of the same configuration as that shown in FIG. 1 will be omitted, and only different portions will be described.

Figure 2:
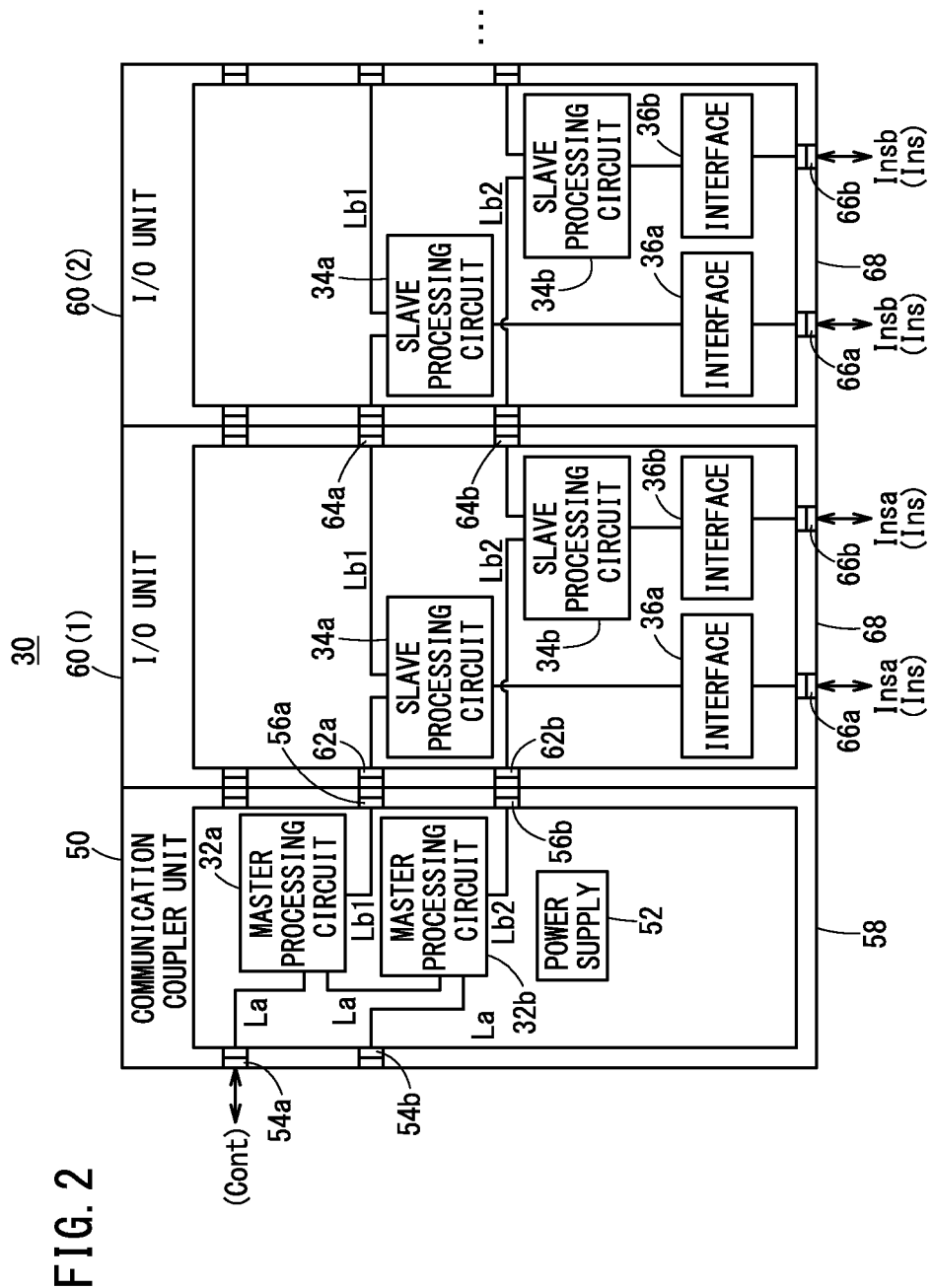
FIG. 2 is a diagram illustrating a communication system according to an embodiment of the present invention.

FIG. 2 is a diagram illustrating the communication system 30 according to an embodiment of the present invention. In FIG. 2, the same components as those in FIG. 1 are denoted by the same reference numerals as those in FIG. 1. However, depending on whether the slave processing circuit 34 belongs to the branch line Lb1 or the branch line Lb2, the reference numeral of the slave processing circuit 34 is described as 34a or 34b. Similarly, depending on whether the interface 36 belongs to the branch line Lb1 or the branch line Lb2, the reference numeral of the interface 36 is described as 36a or 36b.

As shown in FIG. 2, the communication system 30 includes a communication coupler unit 50 and a plurality of I/O units 60. That is, by sequentially connecting the plurality of I/O units 60 having the same configuration to the subsequent stage of the communication coupler unit 50, the communication system 30 is easily formed. The suffixes (1), (2), . . . , (i) of the I/O units 60 are given in accordance with the number of stages from the communication coupler unit 50.

The communication coupler unit 50 functions as a master unit for the I/O units 60. The communication coupler unit 50 includes a master processing circuit 32a, a master processing circuit 32b, a power supply 52, a connector 54a, a connector 54b, a terminal 56a, a terminal 56b, and a housing 58. The master processing circuit 32a and the master processing circuit 32b are made redundant. The master processing circuit 32a, the master processing circuit 32b, the power supply 52, the connector 54a, the connector 54b, the terminal 56a, and the terminal 56b are accommodated in the housing 58.

The power supply 52 supplies electric power to the master processing circuits 32a and 32b. The power supply 52 may supply electric power to at least one of the slave processing circuit 34a, the slave processing circuit 34b, the interface 36a, or the interface 36b of the I/O unit 60.

The connector 54a is a connector for connection with the control device Cont provided in the preceding stage or another communication coupler unit 50 provided in the preceding stage. The connector 54b is a connector for connection with another communication coupler unit 50 provided in the subsequent stage. The connectors 54a and 54b allow the communication coupler unit 50 to be daisy-chain connected to the control device Cont. The terminals 56a and 56b are terminals for connection to the I/O unit 60 provided in the subsequent stage. The I/O unit 60 connected to the terminals 56a and 56b is the first-stage I/O unit 60(1).

The connector 54a is connected to the master processing circuit (first master processing circuit) 32a. The master processing circuit 32a is connected to the terminal 56a. Thus, the connector 54a is connected to the terminal 56a via the master processing circuit 32a. Further, the master processing circuit 32a is connected to the master processing circuit (second master processing circuit) 32b. The master processing circuit 32b is connected to the terminal 56b. Therefore, the connector 54a is connected to the terminal 56b via the master processing circuit 32a and the master processing circuit 32b.

The I/O unit 60 includes a slave processing circuit 34a, a slave processing circuit 34b, an interface 36a, an interface 36b, a terminal 62a, a terminal 62b, a terminal 64a, a terminal 64b, a connector 66a, a connector 66b, and a housing 68. The slave processing circuit 34a, the slave processing circuit 34b, the interface 36a, the interface 36b, the terminal 62a, the terminal 62b, the terminal 64a, the terminal 64b, the connector 66a, and the connector 66b are accommodated in the housing 68.

The terminals 62a and 62b (first and second preceding-stage terminals) are terminals for connection with the communication coupler unit 50 provided in the preceding stage or another I/O unit 60 provided in the preceding stage. The terminals 64a and 64b (first and second subsequent-stage terminals) are terminals for connection with another I/O unit 60 provided in the subsequent stage. The terminal 62a is connected to the slave processing circuit (first slave processing circuit) 34a, and the slave processing circuit 34a is connected to the terminal 64a. The terminal 62b is connected to the slave processing circuit (second slave processing circuit) 34b, and the slave processing circuit 34b is connected to the terminal 64b.

When the communication coupler unit 50 is provided in the preceding stage, the terminal 62a is connected to the terminal 56a of the communication coupler unit 50, and the terminal 62b is connected to the terminal 56b of the communication coupler unit 50. When another I/O unit 60 is provided in the preceding stage, the terminal 62a is connected to the terminal 64a of the other I/O unit 60, and the terminal 62b is connected to the terminal 64b of the other I/O unit 60.

As shown in FIG. 2, a plurality of the slave processing circuits 34a are connected to the master processing circuit 32a in a daisy-chain manner (branch line Lb1) by sequentially connecting the plurality of I/O units 60 provided in the subsequent stage of the communication coupler unit 50. A plurality of the slave processing circuits 34b are connected to the master processing circuit 32b in a daisy-chain manner (branch line Lb2).

The slave processing circuit 34a is connected to the connector 66a via the interface 36a. The slave processing circuit 34b is connected to the connector 66b via the interface 36b. Each of the connector 66a and the connector 66b is a connector for connection with the device Ins. The slave processing circuit 34a is connected to the device Ins by the connector 66a via the interface 36a. The slave processing circuit 34b is connected to the device Ins by the connector 66b via the interface 36b. That is, by connecting the two redundant devices Ins to one I/O unit 60, the two devices Ins can be connected respectively to the different slave processing circuits 34 (34a, 34b).

As described above, the I/O unit 60 according to the present embodiment includes the two redundant slave processing circuits, i.e., the slave processing circuit 34a and the slave processing circuit 34b, that can be connected respectively to the two redundant devices Ins. As a result, the correspondence relationship between the two redundant devices Ins and the I/O unit 60 paired with each of the two devices Ins is clarified, and the possibility that the connection (wiring) therebetween may be erroneously performed is reduced.

Modifications

Figure 3:
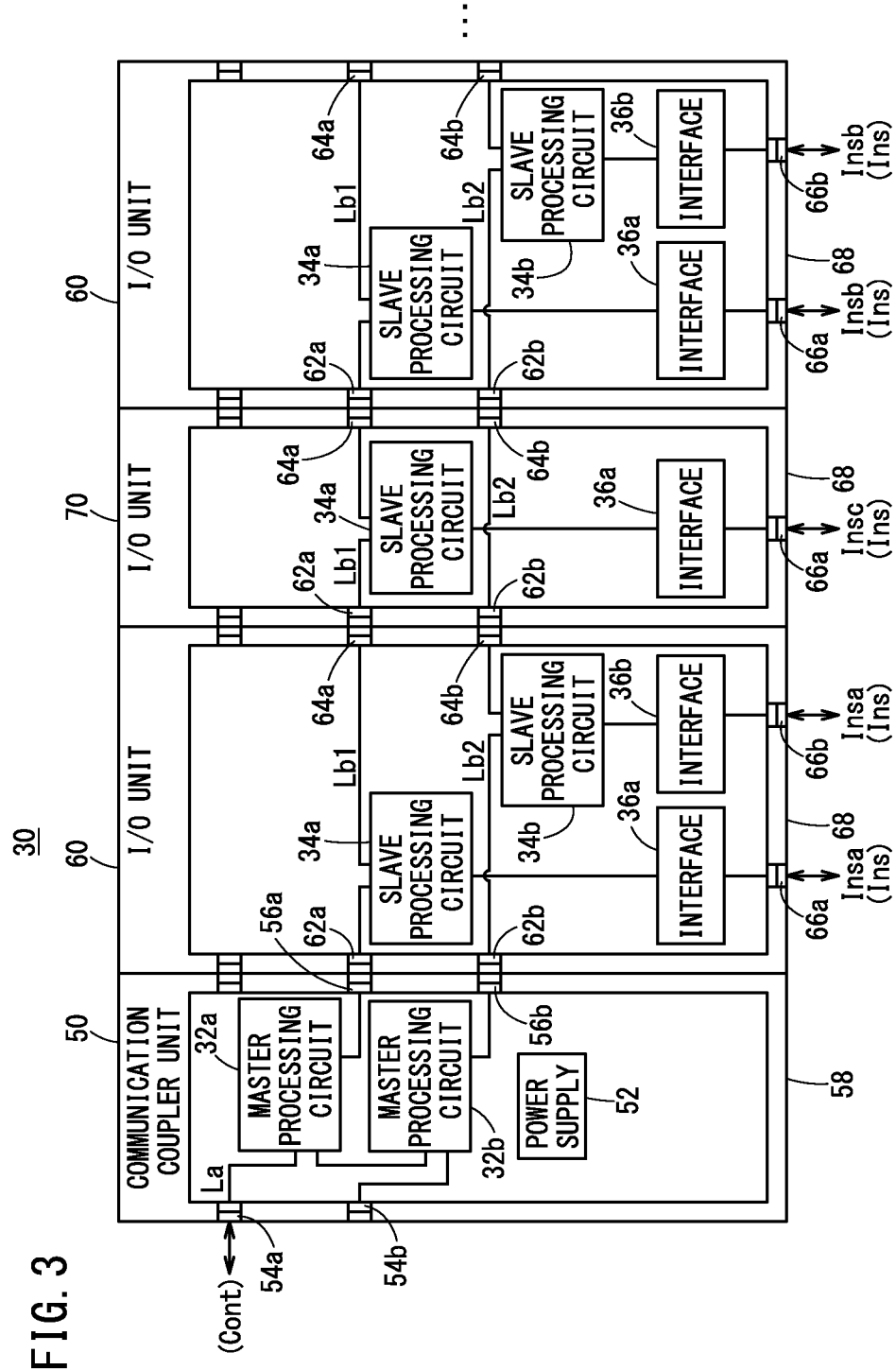
FIG. 3 is a diagram showing a communication system according to a modification of the present invention.

FIG. 3 is a diagram showing a communication system 30 according to a modification of the present invention. Description of the same configuration as that shown in FIG. 2 will be omitted, and only different portions will be described. In the communication system 30 according to the modification, an I/O unit 70 is disposed between the first-stage I/O unit 60 and the second-stage I/O unit 60. The I/O unit 60 at the second stage may be followed by I/O units 60 at the third stage, the fourth stage, and the like.

The I/O unit 70 includes a slave processing circuit 34a, an interface 36a, and a connector 66a. However, unlike the I/O unit 60, the I/O unit 70 does not include the slave processing circuit 34b, the interface 36b, or the connector 66b. Similarly to the I/O unit 60, in the I/O unit 70, the terminal 62a is connected to the terminal 64a via the slave processing circuits 34a by the branch line Lb1. On the other hand, in the I/O unit 70, the terminal 62b is directly connected to the terminal 64b by the branch line Lb2 without passing through the slave processing circuit 34a. That is, the device Ins connected to the I/O unit 70 is connected to the slave processing circuit 34a on the branch line Lb1 and is not connected to the branch line Lb2 side. As a result, the I/O unit 60 can be used to connect the two redundant devices Ins, while the I/O unit 70 (connector 66a) can be used to connect a single non-redundant device Insc.

As described above, the communication system 30 according to the modification includes the I/O unit 70 in addition to the I/O unit 60. A single device Ins (Insc) that is not made redundant is connected to the I/O unit 70. Therefore, the communication system 30 according to the modification can perform input and output of signals with respect to both the redundant device Ins and the non-redundant device Ins. In addition, the correspondence relationship between the redundant device Ins and the I/O unit 60 and the correspondence relationship between the non-redundant device Ins and the I/O unit 70 are clarified. Therefore, the possibility that connection (wiring) between the redundant device Ins and the I/O unit 60 or connection between the non-redundant device Ins and the I/O unit 70 may be erroneously performed is reduced.

Here, the slave processing circuit 34 of the I/O unit 70 is connected to the branch line Lb1. The slave processing circuit 34 of the I/O unit 70 may be connected to the branch line Lb2. In this case, the terminals 62a and 64a of the I/O unit 70 are directly connected to each other not via the slave processing circuit 34. The terminals 62b and 64b are connected to each other via the slave processing circuit 34. That is, the device Ins connected to the I/O unit 70 is connected to the slave processing circuit 34 (slave processing circuit 34b) belonging to the branch line Lb2. In this case, the device Ins connected to the I/O unit 70 is not connected to the slave processing circuit 34 belonging to the branch line Lb1.

Modified Embodiments

The number of master processing circuits 32 in the communication coupler unit 50, the number of slave processing circuits 34 in the I/O unit 60, and the number of interfaces 36 in the I/O unit 60 are not particularly limited as long as they are equal to each other. For example, in the above-described embodiment, a case where the number of the master processing circuits 32 in the communication coupler unit 50, the number of the slave processing circuits 34 in the I/O unit 60, and the number of the interfaces 36 in the I/O unit 60 are each two has been described as an example. However, the number of the master processing circuits 32 in the communication coupler unit 50, the number of the slave processing circuits 34 in the I/O unit 60, and the number of the interfaces 36 in the I/O unit 60 may each be three or more (triple or more redundancy).

Invention Obtained from Embodiments

The invention that can be grasped from the above-described embodiments and modifications will be described below.

(1) The I/O unit (input/output unit) (60) connects the master unit (communication coupler unit 50) and the device (Ins (Insa, Insb)), and transmits signals between the master unit and the device. The master unit includes the two redundant master processing circuits (master processing circuits 32a and 32b). The I/O unit includes: the first slave processing circuit (slave processing circuit 34a) configured to perform input and output of a signal with respect to one of the two redundant master processing circuits; and the second slave processing circuit (slave processing circuit 34b) configured to perform input and output of a signal with respect to the other of the two redundant master processing circuits. Thus, by connecting the I/O unit between the master unit and the device, two redundant transmission paths for transmitting a signal between the master unit and the device can be easily formed. In addition, since the two redundant devices only have to be connected to one I/O unit, erroneous connection between the I/O unit and the device is reduced.

(2) The I/O unit is configured to transmit a signal between the two redundant master processing circuits and the two redundant devices. The I/O unit further includes: the first interface (interface 36a) configured to input and output a signal between the first slave processing circuit and one of the two redundant devices; and the second interface (interface 36b) configured to input and output a signal between the second slave processing circuit and another of the two redundant devices. With this configuration, the I/O unit can relay two signals between the two redundant master processing circuits and the two redundant devices by using the two slave processing circuits.

(3) The I/O unit further includes: the first preceding-stage terminal (terminal 62a) configured to connect the first slave processing circuit and one of two master processing circuits of the master unit that is connected to the preceding stage of the I/O unit or the first slave processing circuit of the other I/O unit that is connected to the preceding stage; the second preceding-stage terminal (terminal 62b) configured to connect the second slave processing circuit to the other of the two master processing circuits of the master unit or the second slave processing circuit of the other I/O unit; the first subsequent-stage terminal (terminal 64a) configured to connect the first slave processing circuit and the first slave processing circuit of the other I/O unit connected to the subsequent stage of the I/O unit; and the second subsequent-stage terminal (terminal 64*b*) configured to connect the second slave processing circuit and the second slave processing circuit of the other I/O unit connected to the subsequent stage. With this configuration, by connecting the master unit to the first preceding-stage terminal and the second preceding-stage terminal and connecting the other I/O unit to the first subsequent-stage terminal and the second subsequent-stage terminal, redundant signal communication can be performed between the two slave processing circuits of the other I/O unit and the two master processing circuits, via the two slave processing circuits of the I/O unit.

The invention claimed is:

1. An I/O unit that connects a master unit and two redundant devices and transmits a signal between the master unit and the device, wherein the master unit includes two redundant master processing circuits, the I/O unit comprising:
  a first slave processing circuit configured to perform input and output of a signal between a first master processing circuit that is one of the two redundant master processing circuits and one of the two redundant devices;
  a first subsequent-stage terminal configured to connect the first slave processing circuit and a third slave processing circuit that is one of two slave processing circuits provided at a subsequent-stage unit that is another I/O unit installed at a subsequent stage of the I/O unit;
  a second slave processing circuit configured to perform input and output of a signal between the second master processing circuit that is another of the two redundant master processing circuits and another of the two redundant devices;
  a second subsequent-stage terminal configured to connect the second slave processing circuit and a fourth slave processing circuit that is another of the two slave processing circuits provided at the subsequent-stage unit; and
  a housing configured to be a separate entity from the master unit and each of the two redundant devices and to house the first slave processing unit and the second slave processing unit,
  wherein
  the third slave processing circuit is connected to the first master processing circuit via the first subsequent-stage terminal and the first slave processing circuit, and
  the fourth slave processing circuit is connected to the second master processing circuit via the second subsequent-stage terminal and the second slave processing circuit.

2. The I/O unit according to claim 1, further comprising:
  a first interface configured to input and output a signal between the first slave processing circuit and one of the two redundant devices; and
  a second interface configured to input and output a signal between the second slave processing circuit and another of the two redundant devices.

3. The I/O unit according to claim 1, further comprising:
  a first preceding-stage terminal configured to connect
    the first slave processing circuit and the first master processing circuit installed at a preceding stage of the I/O unit or
    the first slave processing circuit and a fifth slave processing circuit that is one of two slave processing circuits provided at a preceding-stage unit that is another I/O unit that is installed at the preceding stage; and
  a second preceding-stage terminal configured to connect
    the second slave processing circuit and the second master processing circuit installed at the preceding stage or
    the second slave processing circuit and a sixth slave processing circuit that is another of the two slave processing circuits provided at the preceding-stage unit.

\* \* \* \* \*